(12) United States Patent
Featherstone (10) Patent No.: US 10,310,361 B1
(45) Date of Patent: Jun. 4, 2019

(54) PERSONAL IMAGING KIOSK AND ASSOCIATED USE THEREOF

(71) Applicant: Amo Mangal Featherstone, Jamaica, NY (US)

(72) Inventor: Amo Mangal Featherstone, Jamaica, NY (US)

( * ) Notice: Subject to any disclaimer, the term of this patent is extended or adjusted under 35 U.S.C. 154(b) by 0 days.

(21) Appl. No.: 16/000,815

(22) Filed: Jun. 5, 2018

Related U.S. Application Data (60) Provisional application No. 62/515,412, filed on Jun. 5, 2017.

(51) Int. Cl.
| | |
|---|---|
| *G03B 17/53* | (2006.01) |
| *G06K 9/00* | (2006.01) |
| *H04N 1/00* | (2006.01) |
| *E04H 1/12* | (2006.01) |

(52) U.S. Cl.
CPC ............ *G03B 17/53* (2013.01); *E04H 1/125* (2013.01); *G06K 9/00221* (2013.01); *H04N 1/00289* (2013.01)

(58) Field of Classification Search
None
See application file for complete search history.

(56) References Cited

U.S. PATENT DOCUMENTS

| | | | | |
|---|---|---|---|---|
| 3,812,506 A | * | 5/1974 | Klebanow ............... | G03B 15/06 396/1 |
| 5,500,700 A | * | 3/1996 | Massarsky ............. | G03B 17/53 348/E7.086 |
| 5,897,220 A | * | 4/1999 | Huang ................... | G03B 17/53 348/552 |
| 6,229,904 B1 | * | 5/2001 | Huang ................... | G03B 17/53 345/473 |
| 2004/0218916 A1 | * | 11/2004 | Yamaguchi ............ | G03B 17/53 396/263 |
| 2014/0211065 A1 | * | 7/2014 | Sudheendra ....... | H04N 5/23293 348/333.02 |
| 2014/0306999 A1 | * | 10/2014 | Yim ........................ | G06T 11/60 345/635 |
| 2015/0310307 A1 | * | 10/2015 | Gopalan ............... | G06F 16/783 382/103 |

\* cited by examiner

*Primary Examiner* — William B Perkey
(74) *Attorney, Agent, or Firm* — Ashkan Najafi (57) ABSTRACT

A personal imaging kiosk includes a portable, free-standing, modular booth including at least one camera configured to capture images of a user seated at the modular booth, and a controller in communication with the at least one camera. Such a controller includes a graphic user interface, and computer software instructions in communication with the graphic user interface and being configured to automatically superimpose a personalized collage of the captured images based on a demonstrative facial reply of the user to media content observed by the user at the modular booth. A facial recognition device is in communication with the controller for capturing the demonstrative facial reply of the user to media content observed by the user at the portable, free-standing, modular booth.

16 Claims, 6 Drawing Sheets

PERSONAL IMAGING KIOSK AND ASSOCIATED USE THEREOF

CROSS REFERENCE TO RELATED APPLICATIONS

This is a non-provisional patent application that claims the benefit of U.S. provisional patent application No. 62/515,412 filed Jun. 5, 2017, which is incorporated by reference herein in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to photo booths and, more particularly, to a personal imaging kiosk including an easy-to-use, private photo booth—designed to enable consumers to quickly and easily obtain high-quality digital photographic images of themselves for passports, other IDs, and portraits. Operated in a self-service format, designed to accept cash, credit- or debit-cards, and featuring a height-adjustable seat, the kiosk offers consumers a quality, quick and easy, low-cost alternative to the services of a professional photographer.

Prior Art

In the 1980s and 1990s, digital photography arrived on the scene, and by the early-2000s, traditional film cameras had been almost completely replaced by their increasingly sophisticated digital successors. Digital cameras offer several advantages: there is no film to purchase, load, or develop; picture quality, resolution, and color are equal to those of film, and can be edited in various ways with computer programs such as Adobe Photoshop®. Digital cameras are convenient and easy to use; and many have sufficient storage and memory to hold thousands of images, which can then be downloaded into a personal computer, printed, uploaded to a photo-sharing website, or e-mailed. As in music, telephones, and television, the Digital Age of photography has arrived; and those photographers working with film are now few and far between. To the popularity of digital cameras, add the near-universality of smartphones—which produce high-definition, high-resolution images equal to those of most cameras: and today, without doubt, more people are practicing photography than ever before.

Despite the popularity of digital cameras and smartphones, however, there are still occasions—and photographs—for which people must go to a professional photographer's studio. Among these are portraits, of course—but also the photos which represent us on passports and other photo IDs. But while the old-school photo booths one used to find in arcades—usually used by kissing couples on a date—have faded from the contemporary landscape, having been replaced by the smartphone selfie.

Accordingly, a need remains for a personal imaging kiosk in order to overcome at least one of the above-noted shortcomings. The exemplary embodiment(s) satisfy such a need by an easy-to-use, private photo booth—designed to enable consumers to quickly and easily obtain high-quality digital photographic images of themselves for passports, other IDs, and portraits, which is convenient and easy to use, lightweight yet durable in design, versatile in its applications, and designed for being operated in a self-service format, designed to accept cash, credit- or debit-cards, and featuring a height-adjustable seat, the kiosk offers consumers a quality, quick and easy, low-cost alternative to the services of a professional photographer.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a personal imaging kiosk for providing quick, easy, and high-quality images. These and other objects, features, and advantages of the non-limiting exemplary embodiment(s) are provided by a personal imaging kiosk including a portable, free-standing, portable, free-standing, modular booth including at least one camera configured to capture images of a user seated at the portable, free-standing, modular booth, and a controller in communication with the at least one camera. Such a controller includes a graphic user interface, and computer software instructions in communication with the graphic user interface and being configured to automatically superimpose a personalized collage of the captured images based on a demonstrative facial reply of the user to media content observed by the user at the portable, free-standing, modular booth. A facial recognition device is in communication with the controller for capturing the demonstrative facial reply of the user to media content observed by the user at the portable, free-standing, modular booth. A media playback device is in communication with the controller and the facial recognition device for playing back media to the user at the portable, free-standing, modular booth. A monitor is in communication with the controller and the at least one camera for illustrating a preview of the personalized collage of the captured images.

In a non-limiting exemplary embodiment, the controller further includes a processor, and a memory in communication with the processor. Such a memory contains the computer software instructions executed by the processor. Advantageously, the control logic algorithm includes the steps of: receiving a first signal, from the facial recognition device, containing the demonstrative facial reply of the user viewing media content via the media playback device; using the first signal to automatically track the demonstrative facial reply of the user to the media content being observed by the user by detecting the user's facial replies, movements, and gestures while viewing the media content; distinctively categorizing the user's facial replies and automatically tracking user-specific information for the users; providing user-specific information about the user including: user identification, the media content observed by the user, and user movements, user gestures and the user's most recent facial reply while viewing the media content; selecting predefined background images to be personalized to the user based on information provided by the facial recognition device; displaying the personalized collage of the captured images to the user via the monitor by automatically associating and linking the predefined background images to the captured images received from the facial recognition device, and superimposing the predefined background images with the captured images on one canvas.

In a non-limiting exemplary embodiment, the portable, free-standing, modular booth further includes a communication device operably coupled to the controller and being responsive to the output signal for transmitting the personalized collage of the captured images to a remote location away from the portable, free-standing, modular booth.

In a non-limiting exemplary embodiment, the portable, free-standing, modular booth further includes a seat located in a view of the at least one camera, the facial recognition device, and the media playback device.

In a non-limiting exemplary embodiment, the portable, free-standing, modular booth further includes a payment processing terminal in communication with the controller.

In a non-limiting exemplary embodiment, the portable, free-standing, modular booth further includes a background screen situated posterior of the seat.

In a non-limiting exemplary embodiment, the portable, free-standing, modular booth further includes a light-emitting source operably coupled to the at least one camera for providing illumination during an image capturing process.

In a non-limiting exemplary embodiment, the portable, free-standing, modular booth further includes: an anterior section positioned in front of the user seated on the seat, a posterior section spaced rearward from the anterior section and positioned behind the user seated on the seat, and a medial floor section intercalated between the anterior section and the posterior section, the medial floor section supporting the seat thereon.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about" means approximately or nearly and in the context of a numerical value or range set forth means±15% of the numerical.

If used herein, "substantially" means largely if not wholly that which is specified but so close that the difference is insignificant.

The non-limiting exemplary embodiment(s) is/are referred to generally in FIGS. 1-7 and is/are intended to provide a personal imaging kiosk 10 including an easy-to-use, private photo booth 11—designed to enable consumers to quickly and easily obtain high-quality digital photographic images of themselves for passports, other IDs, and portraits. Operated in a self-service format, designed to accept cash, credit- or debit-cards, and featuring a height-adjustable seat 22, the kiosk 10 offers consumers a quality, quick and easy, low-cost alternative to the services of a professional photographer. It should be understood that the exemplary embodiment(s) may be used to take a variety of pictures, and should not be limited to any particular picture described herein.

Referring to FIGS. 1-7 in general, a personal imaging kiosk 10 includes a portable, free-standing, portable, free-standing, modular booth 11 including at least one camera 12 configured to capture images of a user seated at the portable, free-standing, modular booth 11, and a controller 13 in communication with the at least one camera 12. Such a controller 13 includes a graphic user interface 14, and computer software instructions 15 in communication with the graphic user interface 14 and being configured to automatically superimpose a personalized collage of the captured images based on a demonstrative facial reply of the user to media content observed by the user at the portable, free-standing, modular booth 11. A facial recognition device 16 is in communication with the controller 13 for capturing the demonstrative facial reply of the user to media content observed by the user at the portable, free-standing, modular booth 11. A media playback device 17 is in communication with the controller 13 and the facial recognition device 16 for playing back media to the user at the portable, free-standing, modular booth 11. A monitor 18 is in communication with the controller 13 and the at least one camera 12 for illustrating a preview of the personalized collage of the captured images.

Figure 1:
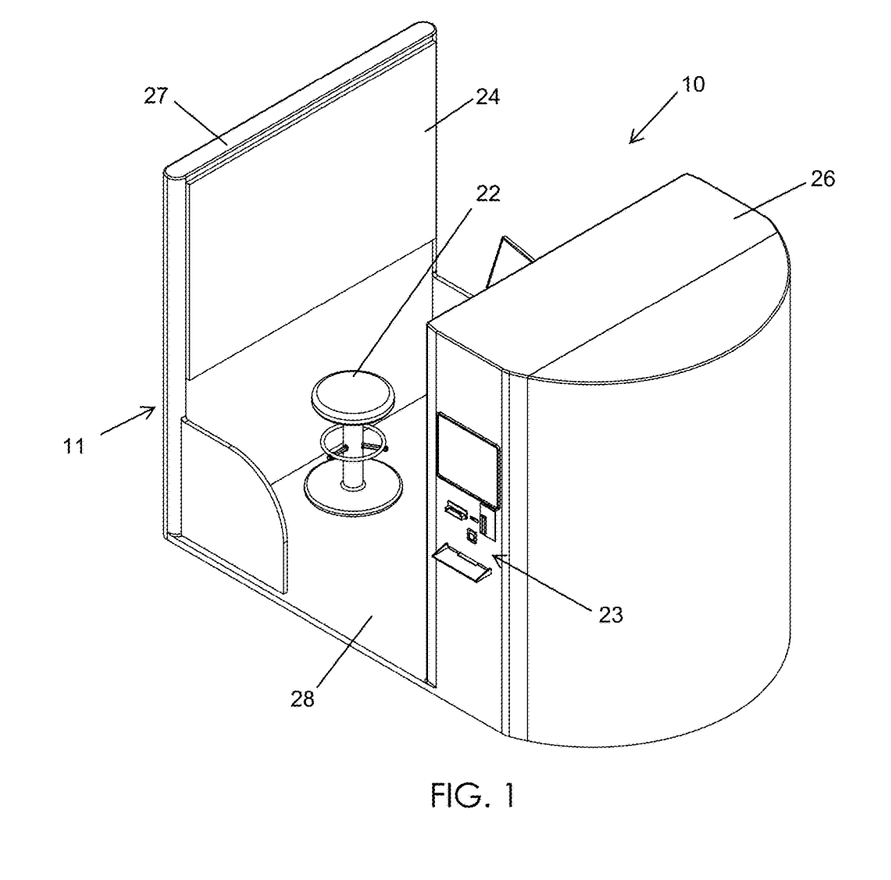
FIG. 1 is a perspective view of a portable, free-standing, modular personal imaging kiosk, in accordance with a non-limiting exemplary embodiment of the present disclosure.
Figure 2:
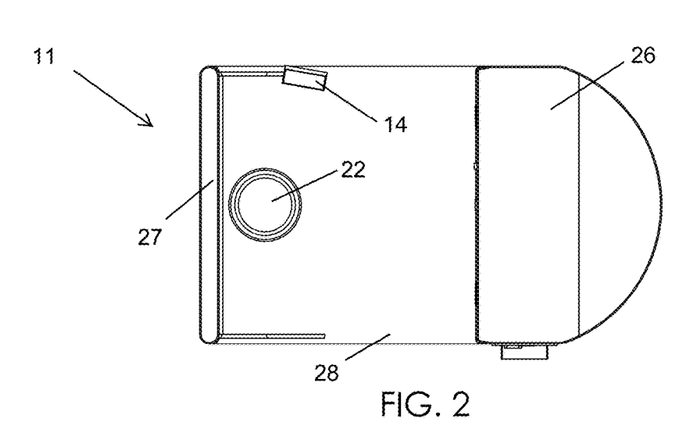
FIG. 2 is a top plan view of the portable, free-standing, modular personal imaging kiosk shown in FIG. 1.
Figure 3:
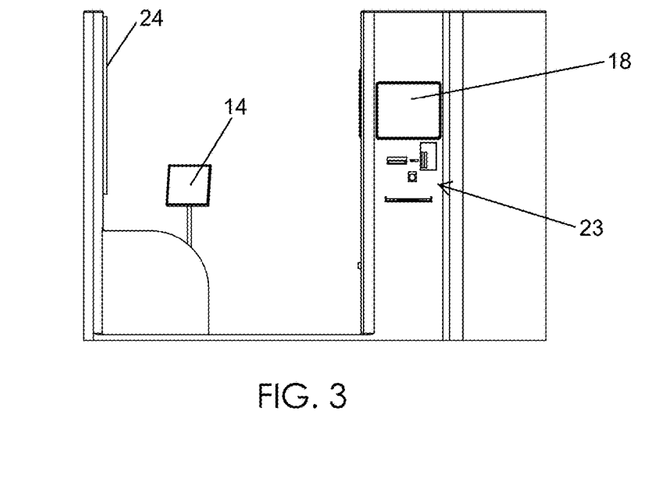
FIG. 3 is a side elevational view of the portable, free-standing, modular personal imaging kiosk shown in FIG. 1.
Figure 4:
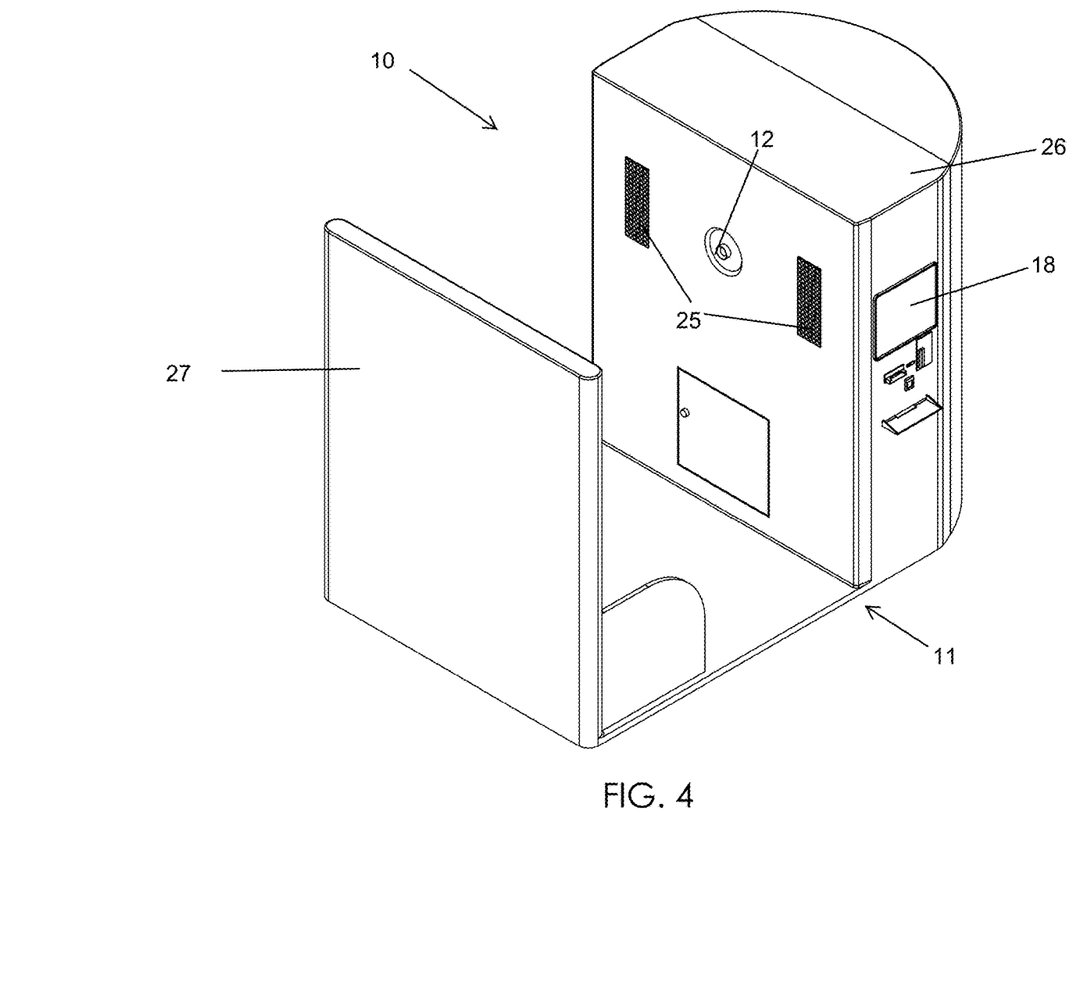
FIG. 4 is another perspective view of the portable, free-standing, modular personal imaging kiosk shown in FIG. 1.
Figure 5:
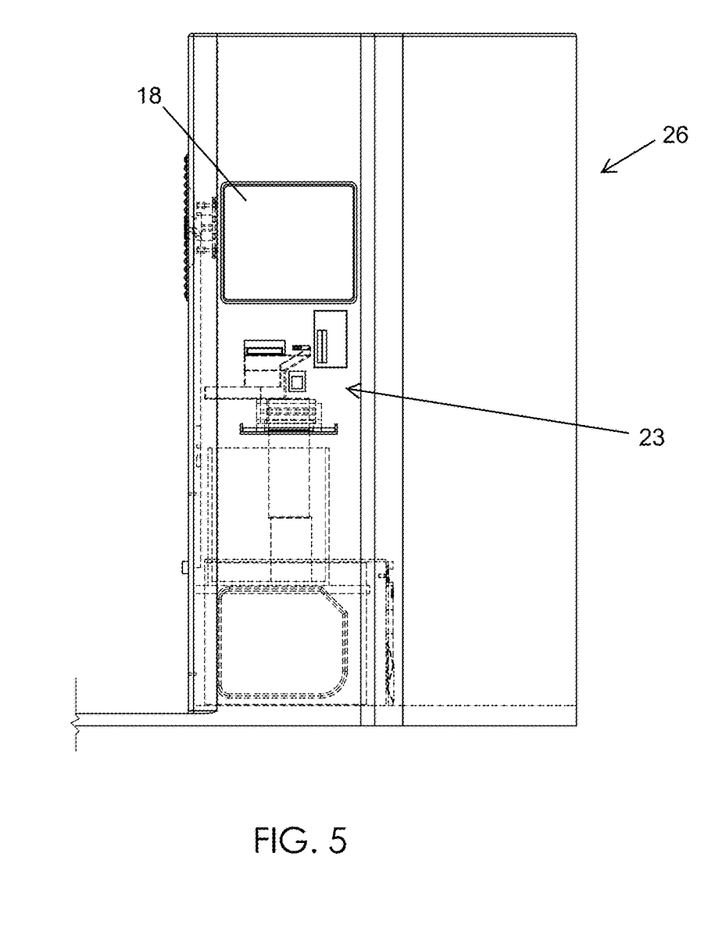
FIG. 5 is a partial transparent view of the portable, free-standing, modular personal imaging kiosk shown in FIG. 1.
Figure 6:
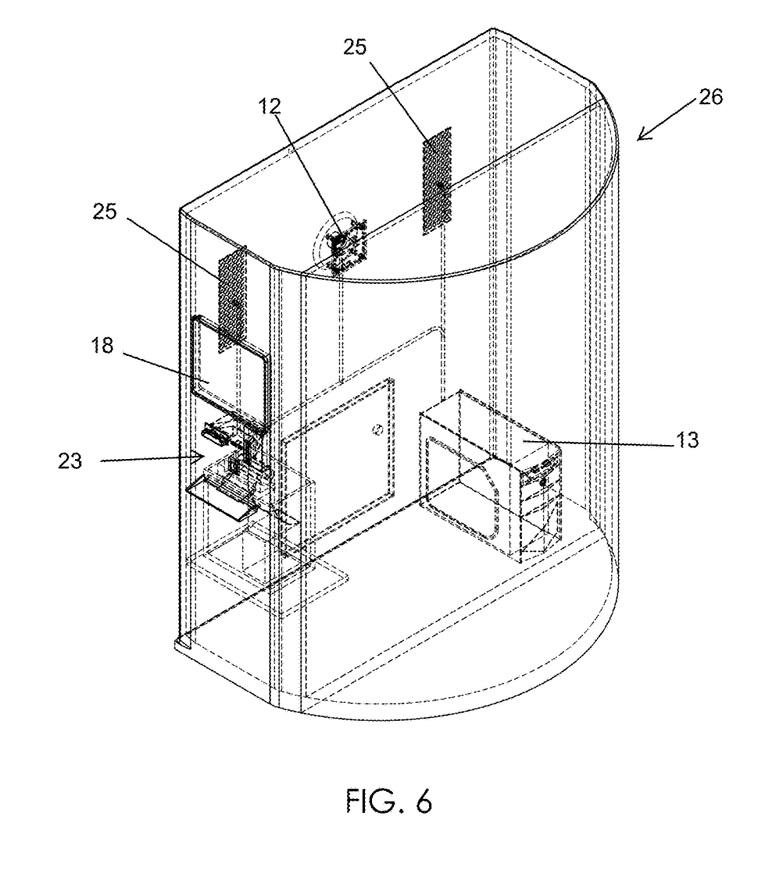
FIG. 6 is a transparent view of the anterior section of the portable, free-standing, modular personal imaging kiosk shown in FIG. 1.
Figure 7:
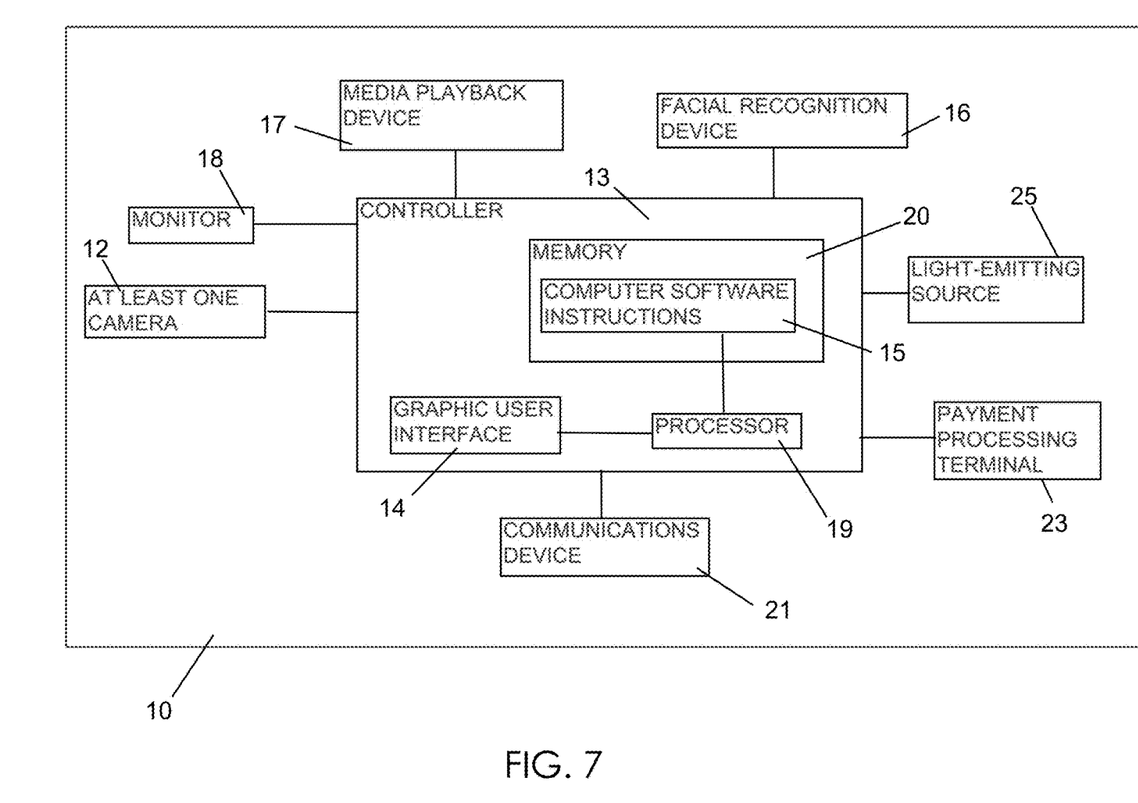
FIG. 7 is a high-level schematic diagram showing the interrelationship between the major electronic components of the portable, free-standing, modular personal imaging kiosk, in accordance with a non-limiting exemplary embodiment of the present disclosure.

In a non-limiting exemplary embodiment, the controller 13 further includes a processor 19, and a memory 20 in communication with the processor 19. Such a memory 20 contains the computer software instructions 15 executed by the processor 19. Advantageously, the control logic algorithm includes the steps of: receiving a first signal, from the facial recognition device 16, containing the demonstrative facial reply of the user viewing media content via the media playback device 17; using the first signal to automatically track the demonstrative facial reply of the user to the media content being observed by the user by detecting the user's facial replies, movements, and gestures while viewing the media content; distinctively categorizing the user's facial replies and automatically tracking user-specific information for the users; providing user-specific information about the user including: user identification, the media content observed by the user, and user movements, user gestures and the user's most recent facial reply while viewing the media content; selecting predefined background images to be personalized to the user based on information provided by the facial recognition device 16; displaying the personalized collage of the captured images to the user via the monitor 18 by automatically associating and linking the predefined background images to the captured images received from the facial recognition device 16, and superimposing the predefined background images with the captured images on one canvas.

In a non-limiting exemplary embodiment, the facial recognition device 16 may be configured to capture facial recognition video/images with depth information including a depth image that may include depth values via any suitable technique including, for example, time-of-flight, structured light, stereo image, or the like. According to one embodiment, the facial recognition device 16 may organize the calculated depth information into "P layers," or layers that may be perpendicular to a depth axis extending from a depth camera along its line of sight.

In a non-limiting exemplary embodiment, facial recognition device 16 initially detects facial recognitions of a user viewing media content in a field of view, of the facial recognition device 16. Facial recognition device 16 provides a visual image of the facial replies to the controller 13. Controller 13 performs the identification of the user's facial replies by the facial recognition device 16. In one embodiment, controller 13 includes a facial recognition engine (software module) to perform the identification of the users. Facial recognition engine may correlate a user's face from the visual image received from the facial recognition device 16 with a reference visual image to determine the user's identity. In another example, the user's identity may be also determined by receiving input from the user identifying their identity via the graphic user interface 14. In one embodiment, users may be asked to identify themselves by standing in front of the computing system so that the facial recognition device 16 may detect facial recognition depth images and visual images for each user. For example, a user may be asked to stand in front of the facial recognition device 16, turn around, and make various poses. After the computing system obtains data necessary to identify a user, the user is provided with a unique identifier and password identifying the user.

In a non-limiting exemplary embodiment, facial recognition device 16 may automatically track a user's demonstrative facial reply to the media content being observed by the user by detecting the user's facial expressions and/or vocal facial replies to the media content. In one example, facial recognition device 16 may detect facial expressions and/or vocal facial replies such as smiles, laughter, cries, frowns, yawns or applauses from the user. In one embodiment, the facial recognition engine in the controller 13 may identify the facial expressions performed by a user by comparing the data facial replies by the at least one camera 12 (e.g., depth camera and/or visual camera) in the facial recognition device 16 to one or more facial expression filters in a facial expressions library in the facial recognition engine. Facial expressions library may include a collection of facial expression filters, each comprising information concerning a user's facial expression. In another example, facial recognition engine may also compare the data facial replies by a microphone in the facial recognition device 16 to the facial expression filters in the facial expressions library to identify one or more vocal facial replies, such as, for example, sounds of laughter or applause associated with a facial expression.

As a non-limiting example, when the user provides a happy demonstrative reply to the media, the user's captured image is automatically superimposed with a predefine background image of a sun, bright sky, flowers, smiling emojis, etc. Thus, the user's reaction to the media determines which predefined background images will be associated with the user's captured image.

As a non-limiting example, when the user provides a said demonstrative reply to the media, the user's captured image is automatically superimposed with a predefine background image of clouds, overcast sky, rain, frowning emojis, etc. Thus, the user's reaction to the media determines which predefined background images will be associated with the user's captured image.

In a non-limiting exemplary embodiment, the portable, free-standing, modular booth 11 further includes a communication device 21 operably coupled to the controller 13 and being responsive to the output signal for transmitting the personalized collage of the captured images to a remote location away from the portable, free-standing, modular booth 11. By way of example and not limitation, the communications device 21 may communicate with the controller 13 using one or more wireless LAN (WLAN) protocols, using low power, ultra-wide band (UWB) communication signals or some other type of wireless signals for RF or optical (e.g., infrared) communication of information to controller 13. A real-time WLAN protocol or a standard wireless LAN protocol such as that of IEEE 802.11.times., Bluetooth or IrDA may be used without departing from the scope of the present invention. A local network that connects the communications device 21 to their respective local computer systems may, for example, consist of a single, unified full duplex LAN, such as a 100BaseT Ethernet LAN. Alternatively, the local network may include two or more interconnected LANs or other network communications means. Any of a variety of other types of computer systems and associated applications may be provided on the network.

In a non-limiting exemplary embodiment, the portable, free-standing, modular booth 11 further includes a seat 22 located in a view of the at least one camera 12, the facial recognition device 16, and the media playback device 17.

In a non-limiting exemplary embodiment, the portable, free-standing, modular booth 11 further includes a payment processing terminal 23 in communication with the controller 13.

In a non-limiting exemplary embodiment, the portable, free-standing, modular booth 11 further includes a background screen 24 situated posterior of the seat 22.

In a non-limiting exemplary embodiment, the portable, free-standing, modular booth 11 further includes a light-emitting source 25 operably coupled to the at least one camera 12 for providing illumination during an image capturing process.

In a non-limiting exemplary embodiment, the portable, free-standing, modular booth 11 further includes: an anterior section 26 positioned in front of the user seated on the seat 22, a posterior section 27 spaced rearward from the anterior section 26 and positioned behind the user seated on the seat 22, and a medial floor section 28 intercalated between the anterior section 26 and the posterior section 27, the medial floor section 28 supporting the seat 22 thereon.

Referring to FIGS. 1-7 in general, in a non-limiting exemplary embodiment(s), the personal imaging kiosk 10 is a digital reincarnation of the traditional self-service photo booth 11—a booth designed to enable consumers to quickly and easily obtain high-quality digital photographic images of themselves for passports, other IDs, and portraits, and pay for them with a debit- or credit-card.

The personal imaging kiosk 10 is a self-contained, modular system, measuring perhaps six feet in width by seven feet in height and six feet in depth. The curtained booth 11 contains a height-adjustable seat 22 designed to place the subject's head and shoulders against a white background; a fully automated, flash-equipped, built-in digital camera 12 and printer; and a monitor 18 on which—through a program such as ADOBE PHOTOSHOP®—the sitter may refine and enhance their own image to their liking, adjusting the color, tone, eliminating red-eye, and so forth. The camera 12 and monitor 18 will be operated through a touchscreen, and the personal imaging kiosk 10 will accept cash, coins, credit-cards, and debit-cards. There might also be an Internet link through which users could e-mail their images to friends and family, or upload images to their Facebook or Instagram accounts. Thus, the personal imaging kiosk 10—in addition to creating prints suitable for use with passports and other photo IDs—might also function as an "old school" photo booth 11, strictly for fun, entertainment, and sharing.

In the personal imaging kiosk 10, then, consumers would have a simple, easy-to-use, private system for creating their own photographic prints for passports and other photo IDs, as well as a fun system that hearkens back to the photo booths 11 of yesteryear—but with all state-of-the-art, digital technology for capturing and manipulating images. Ideal for installation in a wide variety of venues—shopping malls; airports; major train stations; cruise-ship ports and cruise ships; large nightclubs and entertainment complexes; sports stadiums and concert arenas; theme parks, ski resorts, and other popular tourist destinations; casinos; outdoor art and music festivals; seasonal beach boardwalks; city squares and open-air markets; conferences and conventions; major hotels; and more—the personal imaging kiosk 10 also is an ideal product and business for franchising. Clever in conception and thoughtful in design, the personal imaging kiosk 10 should find a wide and enthusiastic market reception among the consumers of America and the world.

While non-limiting exemplary embodiment(s) has/have been described with respect to certain specific embodiment(s), it will be appreciated that many modifications and changes may be made by those of ordinary skill in the relevant art(s) without departing from the true spirit and scope of the present disclosure. It is intended, therefore, by the appended claims to cover all such modifications and changes that fall within the true spirit and scope of the present disclosure. In particular, with respect to the above description, it is to be realized that the optimum dimensional relationships for the parts of the non-limiting exemplary embodiment(s) may include variations in size, materials, shape, form, function and manner of operation.

The Abstract of the Disclosure is provided to comply with 37 C.F.R. § 1.72(b) and is submitted with the understanding that it will not be used to interpret or limit the scope or meaning of the claims. In addition, in the above Detailed Description, various features may have been grouped together or described in a single embodiment for the purpose of streamlining the disclosure. This disclosure is not to be interpreted as reflecting an intention that the claimed embodiment(s) require more features than are expressly recited in each claim. Rather, as the following claims reflect, inventive subject matter may be directed to less than all of the features of any of the disclosed non-limiting exemplary embodiment(s). Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiment(s) which fall within the true spirit and scope of the present disclosure. Thus, to the maximum extent allowed by law, the scope of the present disclosure is to be determined by the broadest permissible interpretation of the following claims and their equivalents, and shall not be restricted or limited by the above detailed description.

What is claimed as new and what is desired to secure by Letters Patent of the United States is:

1. A personal imaging kiosk for providing quick, easy, and high-quality images, said personal imaging kiosk comprising: a modular booth including
   at least one camera configured to capture images of a user seated at said modular booth;
   a controller in communication with said at least one camera and including a graphic user interface, and computer software instructions in communication with said graphic user interface and being configured to automatically superimpose a personalized collage of said captured images based on a demonstrative facial reply of the user to media content observed by the user at said modular booth;
   a facial recognition device in communication with said controller for capturing said demonstrative facial reply of the user to media content observed by the user at said modular booth;
   a media playback device in communication with said controller and said facial recognition device for playing back media to the user at said modular booth; and
   a monitor in communication with said controller and said at least one camera for illustrating a preview of said personalized collage of said captured images.

2. The personal imaging kiosk of claim 1, wherein said controller further comprises:
   a processor; and
   a memory in communication with said processor, said memory containing said computer software instructions executed by said processor, wherein said control logic algorithm includes the steps of
      receiving a first signal, from said facial recognition device, containing said demonstrative facial reply of the user viewing media content via said media playback device;
      using said first signal to automatically track said demonstrative facial reply of the user to said media content being observed by the user by detecting the user's facial replies, movements, and gestures while viewing said media content;
      distinctively categorizing the user's facial replies and automatically tracking user-specific information for the users;
      providing user-specific information about the user including: user identification, said media content observed by the user, and user movements, user gestures and the user's most recent facial reply while viewing said media content;
      selecting predefined background images to be personalized to the user based on information provided by the facial recognition device;
      displaying said personalized collage of said captured images to the user via said monitor by
         automatically associating and linking said predefined background images to said captured images received from said facial recognition device, and
         superimposing said predefined background images with said captured images on one canvas.

3. The personal imaging kiosk of claim 2, further comprising:
   a communication device operably coupled to said controller and being responsive to said output signal for transmitting said personalized collage of said captured images to a remote location away from said modular booth.

4. The personal imaging kiosk of claim 3, further comprising: a seat located in a view of said at least one camera, said facial recognition device, and said media playback device.

5. The personal imaging kiosk of claim 4, further comprising: a payment processing terminal in communication with said controller.

6. The personal imaging kiosk of claim 5, further comprising: a background screen situated posterior of said seat.

7. The personal imaging kiosk of claim 6, further comprising: a light-emitting source operably coupled to said at least one camera for providing illumination during an image capturing process.

8. The personal imaging kiosk of claim 7, wherein said modular booth further comprises:
   an anterior section positioned in front of the user seated on said seat;
   a posterior section spaced rearward from said anterior section and positioned behind the user seated on said seat; and
   a medial floor section intercalated between said anterior section and said posterior section, said medial floor section supporting said seat thereon.

9. A personal imaging kiosk for providing quick, easy, and high-quality images, said personal imaging kiosk comprising: a portable, free-standing, portable, free-standing, modular booth including
   at least one camera configured to capture images of a user seated at said portable, free-standing, modular booth;
   a controller in communication with said at least one camera and including
      a graphic user interface, and
      computer software instructions in communication with said graphic user interface and being configured to automatically superimpose a personalized collage of said captured images based on a demonstrative facial reply of the user to media content observed by the user at said portable, free-standing, modular booth;
   a facial recognition device in communication with said controller for capturing said demonstrative facial reply of the user to media content observed by the user at said portable, free-standing, modular booth;
   a media playback device in communication with said controller and said facial recognition device for playing back media to the user at said portable, free-standing, modular booth; and
   a monitor in communication with said controller and said at least one camera for illustrating a preview of said personalized collage of said captured images.

10. The personal imaging kiosk of claim 9, wherein said controller further comprises:
- a processor; and
- a memory in communication with said processor, said memory containing said computer software instructions executed by said processor, wherein said control logic algorithm includes the steps of
    - receiving a first signal, from said facial recognition device, containing said demonstrative facial reply of the user viewing media content via said media playback device;
    - using said first signal to automatically track said demonstrative facial reply of the user to said media content being observed by the user by detecting the user's facial replies, movements, and gestures while viewing said media content;
    - distinctively categorizing the user's facial replies and automatically tracking user-specific information for the users;
    - providing user-specific information about the user including: user identification, said media content observed by the user, and user movements, user gestures and the user's most recent facial reply while viewing said media content;
    - selecting predefined background images to be personalized to the user based on information provided by the facial recognition device;
    - displaying said personalized collage of said captured images to the user via said monitor by
        - automatically associating and linking said predefined background images to said captured images received from said facial recognition device, and superimposing said predefined background images with said captured images on one canvas.

11. The personal imaging kiosk of claim 10, further comprising:
- a communication device operably coupled to said controller and being responsive to said output signal for transmitting said personalized collage of said captured images to a remote location away from said portable, free-standing, modular booth.

12. The personal imaging kiosk of claim 11, further comprising: a seat located in a view of said at least one camera, said facial recognition device, and said media playback device.

13. The personal imaging kiosk of claim 12, further comprising: a payment processing terminal in communication with said controller.

14. The personal imaging kiosk of claim 13, further comprising: a background screen situated posterior of said seat.

15. The personal imaging kiosk of claim 14, further comprising: a light-emitting source operably coupled to said at least one camera for providing illumination during an image capturing process.

16. The personal imaging kiosk of claim 15, wherein said portable, free-standing, modular booth further comprises:
- an anterior section positioned in front of the user seated on said seat;
- a posterior section spaced rearward from said anterior section and positioned behind the user seated on said seat; and
- a medial floor section intercalated between said anterior section and said posterior section, said medial floor section supporting said seat thereon.

* * * * *